United States Patent [19]

Wu et al.

[11] Patent Number: 5,330,736
[45] Date of Patent: Jul. 19, 1994

[54] ZEOLITE L SYNTHESIS AND RESULTING PRODUCT

[75] Inventors: Jianxin Wu, Elkridge; David M. Chapman, Ellicott City; Robert R. Gatte, Columbia, all of Md.

[73] Assignee: W. R. Grace & Co.-Conn., New York, N.Y.

[21] Appl. No.: 986,406

[22] Filed: Dec. 7, 1992

[51] Int. Cl.$^5$ .............................................. C01B 33/26
[52] U.S. Cl. .................................. 423/709; 423/328.1; 423/330.1; 502/64
[58] Field of Search ............ 423/709, DIG. 28, 328.1, 423/330.1; 502/64, 60

[56] References Cited

U.S. PATENT DOCUMENTS

| | | | |
|---|---|---|---|
| 3,216,789 | 11/1965 | Breck | 423/718 |
| 3,639,099 | 2/1972 | Elliott, Jr. et al. | 423/709 |
| 3,808,264 | 4/1974 | McDaniel et al. | 423/709 |
| 3,867,512 | 2/1975 | Young | 423/710 |
| 3,947,482 | 3/1976 | Albers et al. | 423/709 |
| 4,160,011 | 7/1979 | Estes et al. | 423/709 |
| 4,166,099 | 8/1979 | McDaniel et al. | 423/709 |
| 4,343,723 | 8/1982 | Rogers et al. | 502/68 |
| 4,530,824 | 7/1985 | Arika et al. | 423/DIG. 28 |
| 4,657,749 | 4/1987 | Vaughan | 423/710 |
| 4,701,315 | 10/1987 | Wortel | 423/718 |
| 4,888,105 | 12/1989 | Huss, Jr. et al. | 208/137 |
| 4,956,166 | 9/1990 | Verduijn | 423/700 |
| 5,017,353 | 5/1991 | Verduijn | 423/DIG. 28 |

FOREIGN PATENT DOCUMENTS

| | | | |
|---|---|---|---|
| 0096479 | 12/1983 | European Pat. Off. | |
| 0150256 | 8/1985 | European Pat. Off. | 423/709 |
| 1202511 | 8/1970 | United Kingdom | |

OTHER PUBLICATIONS

R. M. Barrier & J. A. Lee, "Hydrocarbons in Zeolite L", Surface Science 12 (1968) 341–353.
Lechoslawa Wilkosz, Pr. Chem 409 (1974) Chemical Abstract, vol. 90 (1979) 53747F, p. 4.
G. V. Tsitsishvilli et al in Doklady Akademii NaukSSR, vol. 243, pp. 438–440 (1978), p. 4.
Y. Nishiimura in Nippon Kagaku Zasshi 91,11,1970, pp. 1046–1049.
Aiello and Barrier, J. Chem. Soc. Dalton, 1470 (1970).
Barrier et al., J. Chem. Soc. Dalton, 1259(1972).
Barrier et al., J. Chem. Soc. Dalton, 934(1974).

*Primary Examiner*—Anthony McFarlane
*Attorney, Agent, or Firm*—Edward J. Cabic

[57] ABSTRACT

Zeolite L is made from an aqueous precursor mixture that contains from 0.1 to about 10% by weight of an amorphous aluminosilicate seeding gel which does not contain zeolite L. Using this mixture zeolite L can be made in a much shorter time than with a synthesis mixture without the seeding gel, and with substantially no zeolite T impurity. When made at temperatures below about 120° C the zeolite. L has a disk-shaped morphology which is substantially free of zeolite T (offretite type).

8 Claims, 3 Drawing Sheets

ZEOLITE L SYNTHESIS AND RESULTING PRODUCT

BACKGROUND OF THE INVENTION

This invention relates to a novel and improved process for synthesizing a zeolite L-type material. In particular, the preparation procedure of this invention utilizes a seeding technique which substantially improves the nucleation and crystallization rates. This process reduces the time required for the manufacture of zeolite L-type material and the synthesis can be done under atmospheric pressure in much shorter times therefore avoiding the need to use autoclaves at elevated pressures. Furthermore, zeolite L prepared using the seeding technique is highly pure and free of zeolite T which is a common contaminant in conventional synthesis. In view of the increasing importance of developing energy efficient processing, such processes have major industrial importance. Compared to the conventional processes for preparing L-type zeolites, the method of this invention is superior from the viewpoint of energy utilization for a given product quality and yield.

A synthetic, crystalline potassium-containing zeolite designated as zeolite L has been known to exhibit good catalytic properties, particularly for hydrocarbon conversion, and advantageous sorbent properties as described, for example, by Barrer et al. *Surface Science*, 12, 341 (1968). The chemical composition of zeolite L is described in U.S. Pat. No. 3,216,789 as an aluminosilicate of the formula:

$$0.9-1.3 M_{2/n}O:Al_2O_3:5.2-6.9SiO_2:yH_2O$$

where M is an exchangeable cation of valence n and y is from 0 to 9. Zeolite L has a characteristic X-ray diffraction pattern with the following more significant d(Å) values:

16.1±0.3
7.52±0.04
6.00±0.04
4.57±0.04
4.35±0.04
3.91±0.02
3.47±0.02
3.28±0.02
3.17±0.01
3.07±0.01
2.91±0.01
2.65±0.01
2.46±0.01
2.42±0.01
2.19±0.01

The preparation of zeolite L as described in U.S. Pat. No. 3,216,789 comprises crystallizing the zeolite from a reaction mixture having mole ratios:

$$K_2O/(K_2O+Na_2O)=0.33\sim 1$$

$$(K_2O+Na_2O)/SiO_2=0.35\sim 0.5$$

$$SiO_2/Al_2O_3=10\sim 28$$

$$H_2O/(K_2O+Na_2O)=15\sim 41$$

A common by-product when utilizing the zeolite L synthesis procedure of U.S. Pat No. 3,216,789 is zeolite T (offretite type) contaminant, which has been described in U.S. Pat. No. 4,888,105 below.

British Pat. No. 1,202,511 describes a revised zeolite L preparation which comprises mole ratio of reactants as:

$$K_2O/(K_2O+Na_2O)=0.7\sim 1$$

$$(K_2O+Na_2O)/SiO_2=0.23\sim 0.35$$

$$SiO_2/Al_2O_3=6.7\sim 9.5$$

$$H_2O/(K_2O+Na_2O)=10.5\sim 50$$

U.S. Pat. No. 3,867,512 discloses a preparation of zeolite L from a reaction mixture having a molar composition:

$$K_2O/(K_2O+Na_2O)=0.3\sim 1$$

$$(K_2O+Na_2O)/SiO_2=0.3\sim 0.6$$

$$SiO_2/Al_2O_3=10\sim 40$$

$$H_2O/(K_2O+Na_2O)=15\sim 140$$

in which the silica source is a gel having at least 4.5 weight percent water and prepared in a particular manner.

L. Wilkosz in Pr Chem 409 (1974)-*Chemical Abstract*, vol 90 (1979) 57347f describes the preparation of zeolite L from a synthesis sol prepared by treating a solution containing silica, potassium hydroxide and sodium hydroxide with a second solution containing potassium aluminate, potassium hydroxide and sodium hydroxide and crystallizing for 72 hours at 20° C. and 122 hours at 100° C. The zeolite L product has a $SiO_2/Al_2O_3$ ratio of 6.4, derived from input stoichiometries having $SiO_2/Al_2O_3$ ratios between 15 and 30.

G. V. Tsitsishvilli et al in Doklady Akademii NaukSSSR, Vol 243, pp 438-440 (1978) describe the synthesis of zeolite L from alumina-silica gels containing tributylamine. The gel has the following molar ratios:

$$K_2O/Na_2O=0.5$$

$$(K_2O+Na_2O)/SiO_2=0.72$$

$$SiO_2/Al_2O_3=25$$

$$H_2O/(K_2O+Na_2O)=20$$

$$(K_2O+Na_2O)/Al_2O_3=18$$

Y. Nishiimura in Nippon Kagaku Zasshi 91,11,1970, pp 1046-9 describes in general terms zeolite L preparation from a synthesis mixture containing colloidal silica, potassium aluminate and potassium hydroxide having a $SiO_2/Al_2O_3$ ratio of 15~25, but exemplifies only two synthesis mixtures having the following ratios of components:

$$7K_2O:Al_2O_3:20SiO_2:450H_2O; \text{ and}$$

$$8K_2O:Al_2O_3:10SiO_2:500H_2O.$$

EP 0096479 describes a synthesis procedure of zeolite L having the following composition expressed as molar ratios:

$2.60K_2O:Al_2O_3:10SiO_2:160H_2O$

Scanning electron micrograph (SEM) shows the formed zeolite L to have a cylindrical morphology.

Other workers have prepared zeolite L from gels, mixed base systems and metakaolin. See, e.g., Aiello and Barrer, *J. Chem. Soc.* Dalton, 1470(1970); Barter et al., *J. Chem. Soc.* Dalton, 1259 (1972); Barrer et al., *J. Chem. Soc.* Dalton, 934 (1974); U.S. Pat. No. 3,867,512 to Young and U.S. Pat. No. 4,956,166 to Verduijn.

In the synthesis of crystalline materials, addition of seeds may sometimes facilitate the nucleation and crystal growth of the desired crystalline products. Seeding techniques have been applied to the synthesis of zeolitic materials, which may substantially reduce the time of zeolite formation. The seeds may be microcrystalline materials or XRD-amorphous materials. The following are a summary of U.S. patents in which XRD-amorphous seeds have been used in the synthesis of faujasite zeolite and preformed zeolite L seeds have been used in the synthesis of zeolite L. As it will be seen in the Description of the Preferred Embodiments and Examples below, the present invention is drastically different from previous seeding techniques in that it uses an XRD-amorphous seeding gel, which does not contain potassium, in the synthesis of zeolite L.

In U.S. Pat. No. 3,639,099 Elliot, Jr. discusses the seeding technique as applied to the production of faujasite.

In U.S. Pat. No. 3,808,326 and U.S. Pat. No. 4,166,099 McDaniel et al. describe a method for preparing crystalline aluminosilicate zeolites which involves seeding an alkaline precursor mixture of alumina and silica with small size zeolite seeds, and subsequently reacting the mixture to obtain substantial yields of crystalline zeolite Y. Specifically, they have found that the processing time required to obtain substantial yields of crystalline faujasite zeolite may be drastically reduced by adding as little as from about 0.1 percent to about 10 percent by weight of an extremely finely divided zeolite seeds having particle size below about 0.1 micron to a precursor mixture of alkali metal hydroxide, alumina, and silica. These zeolite seeding gels are prepared by mixing sodium aluminate solution with sodium silicate solution at 0° C. and stirring for one hour at 0° C., and aging at 20° C. for 4 to 16 hours without stirring. The composition of zeolite seeds are said to be of the general formula assigned to synthetic faujasite. The difference between these two patents and the present invention is that these two patents describe the synthesis of faujasite zeolite, not L zeolite.

In U.S. Pat. No. 4,343,723 Rogers et al. discuss the general concept of facilitating crystalline aluminosilicate formation by the use of seeding techniques which substantially reduce reaction time. The seeds are prepared by reacting silica-alumina alkali metal hydroxide and water in appropriate ratios under conditions of time and temperature which yield finely divided silica-alumina seed particles having an average particle size of less than about 0.1 micron. The seeds are then admixed with other reactants to form a mixture which is heated for 18 hours at 205° F. to form 36% faujasite and another unidentified crystalline product. The difference between this patent and the present invention is that this patent describes the synthesis of faujasite zeolite, not L zeolite.

U.S. Pat. No. 4,657,749 describes an approximately stoichiometric synthesis of zeolite L at temperatures from between 80° to 260° C. from gel mixtures which have composition within the following effective general ranges:

$K_2O:Al_2O_3=1.0\sim3.3$ $Na_2O:Al_2O_3=0\sim1.0$ $SiO_2:Al_2O_3=5\sim12$ $H_2O:Al_2O_3=80\sim140$ The shortening of nucleation time is also discussed in the patent for zeolite L synthesis by adding preformed zeolite L as seeds and by aging the reaction slurry or a portion of the slurry at about 10° to 100° C. for about 6 hours to 6 days prior to the crystallization at 80°-160° C. No examples are given which utilize seeding or aging techniques.

U.S. Pat. No. 4,701,315 discloses a synthesis procedure for zeolite L at 150° C. for 72 hours from a crystallizing gel comprising in molar ratios of oxides:

$K_2O/SiO_2=0.22\sim0.36$ $H_2O/K_2O=25\sim90$ $SiO_2/Al_2O_3=6\sim15$

Although the introduction of seeds of preformed zeolite L is discussed in the patent to increase the nucleation rate in the synthesis of zeolite L, it does not present any examples in which seeding techniques have been applied in the preparation of zeolite L.

U.S. Pat. No. 4,701,315 also gives comparative examples which include a reaction at 100° C. and thus may appear to be more relevant to the present invention. In Comparative Example B the synthesis procedure described in Y. Nishimura, Nippon Kagaku Zasshi 91, 11, 1970, pp 1046–9 is repeated to prepare a gel composition $8.0K_2O:Al_2O_3:10SiO_2:500H_2O$ which is crystallized at 100° C. for 65 hours. The product of this Comparative Example is essentially zeolite W, and no zeolite L is formed.

U.S. Pat. No. 4,888,105 describes the use of crystals of zeolite L as seeds and use of tetraalkylammonium cations to suppress the by-product formation of zeolite T (offretite) in the preparation of zeolite L from a reaction mixture having a molar ratio of oxides as follows:

$SiO_2/Al_2O_3=6$ to $30$ $OH^-/SiO_2=0.3$ to $0.8$ $K^+/(K^++Na^+)=0.3$ to $1$ $RN/Al_2O_3=0.2\sim2$ $H_2O/OH^-=10$ to $50$ seeds$=0$ to $10\%$ wherein seeds are crystals of zeolite L, and RN is a source of tetraalkylammonium cation. In the sole example of preparation of this patent, however, no seeds are added to the reaction mixture during the whole synthesis process of zeolite L.

Although there are references in some patents to making zeolite L with seeds of only zeolite L, as the analysis above shows none of the patents actually included an example where they used the zeolite L seeding gel. Furthermore, the present invention uses a seeding gel which does not contain any preformed crystalline zeolite L, which is drastically different from the prior art. Before the present invention, adding a non-zeolite L seeding gel to shorten the synthesis of zeolite L was never discussed.

It is therefore an object of this invention to use seeding techniques to facilitate the nucleation and crystallization of a zeolitic aluminosilicate product.

It is a further object of this invention to use seeding techniques to facilitate the nucleation and crystallization of zeolite L.

It is a further object of this invention to use seeding techniques to facilitate zeolite L formation at 100° C. and ambient pressure.

These and further objects of the present invention will become readily apparent to one skilled in the art as the description of the invention proceeds.

SUMMARY OF THE INVENTION

This invention teaches a process of making L-type zeolite using seeding techniques which reduce the reaction time at ambient temperatures and pressures. The L zeolite produced is highly pure and free of zeolite T contaminant.

In the process represented by this invention, an aqueous precursor is prepared comprising potassium hydroxide, sodium hydroxide, a source of alumina, and a source of silica in the following composition ranges:

$Na_2O$ 0 to 8

$K_2O$ 2 to 9

$Al_2O_3$ 1

$Si_2O$ 5 to 35

$H_2O$ 100 to 600

A seeding gel mixture, prepared from sodium hydroxide, sodium aluminate, sodium silicate, and water, is added to the precursor. This seeding gel, by itself, does not form zeolite L. Instead, if it were heated to 100° C. it would form zeolite Y. The resulting gel mixture is mixed thoroughly and is aged at a temperature of between 60° to 150° C., without stirring, for sufficient period of time to form crystalline L zeolite. Addition of the seeding gel substantially increases the nucleation rate, and crystalline L zeolite begins to form at much shorter time than the same reaction mixtures at the same temperatures but without using seeding techniques.

The L zeolite thus formed from applying seeding techniques is also advantageous in that it is pure, while the zeolite L prepared from a non-seeded mixture contains zeolite T, which is a common contaminant in the zeolite L synthesis.

BRIEF DESCRIPTION OF THE DRAWINGS

FIG. 1a is an X-ray diffraction pattern of a synthesis gel which contains seeding gel, and FIG. 1b is an X-ray diffraction pattern of a control synthesis gel which does not contain seeding gel.

FIG. 2a is an X-ray diffraction pattern of a synthesis gel which contains seeding gel, and FIG. 2b is an X-ray diffraction pattern of a control synthesis gel which does not contain seeding gel.

DESCRIPTION OF THE PREFERRED EMBODIMENTS

Figure 1:
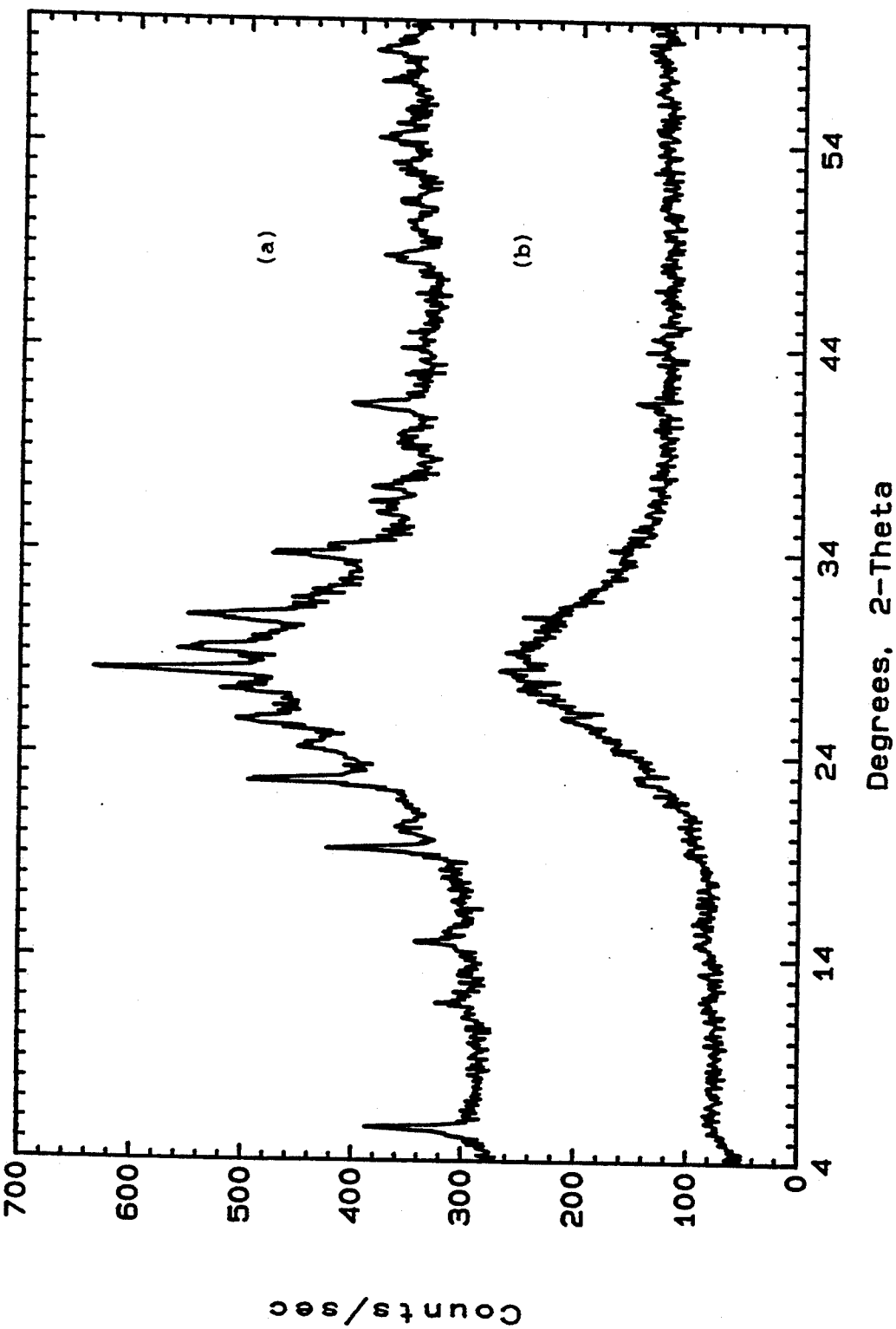
FIG. 1 is a comparison of X-ray diffraction patterns of two synthesis gel mixtures kept at 100° C. for 48 hours from Example 2.

In the process represented by this invention a reaction mixture is prepared comprising potassium hydroxide, sodium hydroxide, a source of alumina, and a source of silica. The silica source may be a colloidal silica gel such as Ludox. The alumina source can be sodium aluminate, potassium aluminate, alumina powder, or aluminum hydroxide. When using alumina powder or aluminum hydroxide they should first be dissolved in hot and concentrated potassium hydroxide aqueous solution to form potassium aluminate solution, or in hot and concentrated sodium hydroxide aqueous solution to form sodium aluminate solution.

The seeding gel used in zeolite L formation is prepared from a modified procedure of Example 1(B) in U.S. Pat. No. 3,808,326 and in U.S. Patent 4,166,099. The process of preparing the seeding gel involves dissolving alumina hydrate in hot sodium hydroxide solution, cooling it down to 0° C., and mixing this sodium aluminate solution with a sodium silicate solution at 0° C. while stirring. The stirring is continued for some time at 0° C. while the temperature warms up to 20° C. The stirring is stopped at 20° C. and the clear solution is aged for between a few hours and a few days until a milky appearance develops. This milky mixture has the following composition:

and is used as the seeding gel for the crystallization of zeolite L. A more detailed description of the seed preparation is presented in U.S. Pat. No. 3,808,326 and 4,166,099.

The significant difference between the present seeding processes and the previous seeding process for zeolite L formation is that the present seeding process does not involve preformed zeolite L, while all the previously discussed seeding processes in the zeolite L formation involve the addition of preformed crystalline zeolite L.

In the standard embodiment sodium hydroxide, potassium hydroxide, and sodium aluminate are dissolved in deionized water. A colloidal silica sol is added into this solution slowly with vigorous stirring to form a reaction mixture. A small amount of the seeding gel is added into this mixture. The resulting gel mixture is homogenized for between a few minutes and a few hours to ensure thorough mixing. It is essential to homogenize the mixture fully before reacting it to form zeolite L.

The reaction mixture has a composition, in terms of mole ratios of oxides, within the following ranges:

After the resulting mixture is thoroughly mixed it is placed in a closed reactor where it is maintained at a temperature of between about 60° and 250° C., preferably between 80° and 150° C. for commercial purposes, to induce crystallization. Although temperatures above 100° C., and thus non-atmospheric pressures, may be used, the generally preferred industrial practice is to operate at atmospheric pressure. An important advantage of the present invention is that the seeding technique described here enables the formation of zeolite L at atmospheric pressure (i.e., at 100° C. or below) in reasonable reaction times that are much shorter than the synthesis process without using a seeding technique. Synthesis mixtures which contain seeding gel will start to form crystalline zeolite L after the gel mixtures are kept at 100° C. for 1 day, while the control gel mixtures, which do not contain seeding gel, exhibit no detectable crystallinity. The difference in crystallization rate of zeolite L formation will become more clear in the specific examples described below. In general, the period of heating will be from 1 to 6 days, depending on the temperature used, until the maximum amount of crystalline zeolite L is formed.

When sufficient time has passed to allow crystallization of zeolite L, the crystals are recovered by filtration from the reaction mixture. The solid should be washed with water until the effluent solution has a pH of between 7 and 11. The closer to unity the ratio of (K+Na) to Al, the better is the zeolite L in terms of sorption capacity. After the washing step, the zeolite crystals may be dried and calcined.

Figure 3:
FIG. 3 is a microphotograph of zeolite L made from Example 4 with a disk-shaped morphology.

When the synthesis reaction is conducted at a temperature of about 120° C. or less the zeolite L crystals have a disk-shaped morphology. See FIG. 3 which is a scanning electron micrograph of the zeolite crystals made in Example 4 which exhibit this disk-shaped morphology. This crystal morphology is significantly different from the conventional cylindrical morphology of zeolite L made at higher temperatures. The zeolite L is substantially free of zeolite T (offretite type) contaminant.

The zeolite L prepared by the process of this invention may be used as a sorbent or as a catalyst, e.g., in a hydrocarbon conversion process such as in cracking or reforming operations, isomerization, aromatization, or alkylation and in the hydrocracking of lube stocks and fuels. To be employed for these applications, the zeolite prepared by the present method may be at least partially dehydrated by calcining at temperatures of up to about 600° C. or more until most of all of the water of hydration is removed.

It may also be desired to exchange part or all of the potassium and sodium cations in the zeolite structure with other cations or to use the acid form of the zeolite containing hydrogen as the cation. The acid form of zeolite L may be obtained by first exchanging the zeolite with ammonium cations followed by calcining the exchanged solid at temperatures of between 500° and 600° C. for a sufficient amount of time to evolve ammonia, thus forming hydrogen-L.

The process described herein represents an improved and efficient procedure for preparing zeolite L since the synthesis time is decreased as a result of applying the seeding technique. Having described the basic aspects of our invention, the following examples are given to illustrate specific embodiments thereof. In all examples, parts and percentages are given by weight and temperatures in degrees Centigrade unless otherwise noted.

EXAMPLE 1

This example demonstrates the procedure to make the seeding mixture and is a modification of Example 1(B) of U.S. Pat No. 3,808,326 and Example 1(B) of U.S. Pat. No. 4,166,099, which disclosures are incorporated herein by reference.

244.71 g of sodium aluminate ($Al_2O_3$:1.248 moles; $Na_2O$: 1.579 moles) was dissolved in 1,907.9 g of deionized water. A sodium silicate solution (Davison) comprising 3,879.0 g of sodium silicate ($SiO_2$:17.288 moles; $Na_2O$: 4.940 moles), 1,040.0 g of sodium hydroxide, and 3,133 g of deionized water was prepared. These solutions were cooled to 0° C. and the sodium aluminate solution was slowly added to the sodium silicate solution within 2.5 hours with stirring to form a mixture with the molar composition of the oxides as follows:

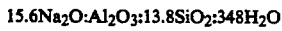

$$15.6Na_2O:Al_2O_3:13.8SiO_2:348H_2O$$

Stirring was continued for another hour at 0° C. and the clear solution was warmed to about 20° C. without stirring. The solution was left at about 20° C. without stirring until a milky appearance developed. This mixture was used as a seeding gel in the preparation of zeolite L below. A portion of this mixture was filtered and the solid was dried in air. X-ray diffraction of the solid showed no detectable crystallinity.

EXAMPLE 2

A zeolite synthesis mixture was prepared by dissolving 3.53 g of sodium aluminate ($Al_2O_3$:53 wt %; $Na_2O$: 41 wt %), 15.69 g of KOH (87.3 wt %), and 7.62 g of NaOH (98.7 wt %) in 100 ml of deionized water. This solution was added to 114 g of aqueous solution containing 32.1 wt % of $SiO_2$. The resulting gel, having the following composition:

$$6.6K_2O:6.5Na_2O:Al_2O_3:33.2SiO_2:549H_2O$$

was homogenized for 1.5 minutes and was divided into two parts.

Part A - Comparison - Without Seeing Gel

One part was homogenized for 1.5 minutes without the addition of any seeding gel. After homogenization, this mixture gel was placed in a closed Teflon FEP bottle and maintained at a temperature of 100° C. for 48 hours. No clear layer of liquid was observed and the mixture was still gel-like. The mixture was filtered, washed with deionized water, and dried at 100° C. The resulting solid is XRD-amorphous and displayed an X-ray diffraction pattern shown in FIG. 1b.

Part B - With Seeding Gel

To the second part was added 5.5 g of seeding gel, prepared according to Example 1 above, and the mixture was homogenized for 1.5 minutes. The gel mixture was placed in a closed Teflon FEP bottle and mainitained at 100° C. for 48 hours. During this period of time the mixture separated into a clear layer of liquid and a solid layer. The solid was collected by filtration, washed with deionized water, and dried at 100° C. The resulting solid contained about 10% of zeolite L and displayed an X-ray diffraction pattern shown in FIG. 1a.

From a comparison of these two runs it is seen that the product prepared without seeds was not crystalline whereas in the same relatively short period of time, the product prepared with the seeding gel according to the present invention contained crystalline zeolite L.

EXAMPLE 3

A synthesis gel was prepared by dissolving 72.0 g of sodium aluminate ($Al_2O_3$:53 wt %; $Na_2O$:41 wt %), 360 g of KOH (87.3 wt %), and 48.0 g of NaOH (98.7 wt %) in 1980 ml of deionized water. This liquid was mixed with 1800 g of a silica gel solution ($SiO_2$:36.0 wt %). The resulting gel, having the following composition:

$$7.5K_2O: 2.9Na_2O:Al_2O_3:28.8SiO_2:465H_2O$$

was homogenized for 1 hour. This gel was then divided into two portions, A and B.

Part A - Comparison - Without Seeding Gel

Figure 2:
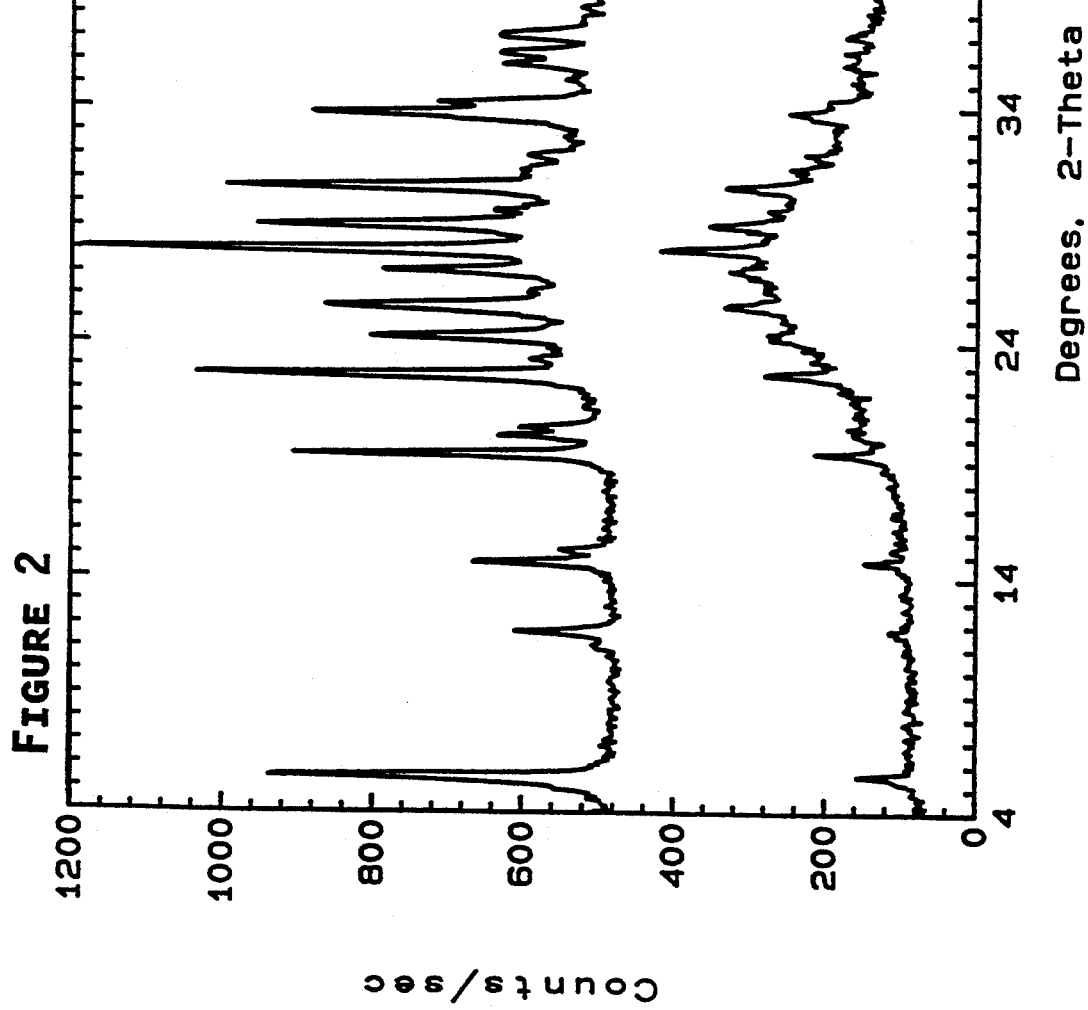
FIG. 2 is a comparison of X-ray diffraction patterns of two synthesis gel mixtures kept at 100° C. for 5 days from Example 3.

Part A of the synthesis mixture was homogenized for 25 minutes without the addition of seeding gel, and was crystallized in a closed Teflon FEP bottle maintained at 100° C. for 5 days. No separation of the liquid and solid was observed. The mixture was filtered, washed with deionized water, and dried at 100° C. The resulting solid contained only a small amount of zeolite L plus a majority of amorphous material, and displayed the XRD pattern shown in FIG. 2b.

Part B - With Seeding Gel

To portion B was added 120 g of a seeding gel mixture which was prepared in Example 1 above, and the resulting gel mixture was homogenized for 25 minutes. The synthesis gel was crystallized in a closed Teflon FEP bottle maintained at 100° C. for 5 days. After this period of time, a clear layer of liquid was separated from a solid which settled to the bottom of the bottle. The product was filtered, washed with deionized water, and dried at 100° C. The resulting solid contained mostly zeolite L free of any zeolite T (offretite type) contaminant, and displayed an X-ray diffraction pattern shown in FIG. 2a.

From a comparison of these two runs it is seen that with no seed the product produced has only a small amount of zeolite L plus a majority of amorphous material, whereas in the same period of time in the presence of the seeding gel according to the present invention one obtains a product with mostly zeolite L free of any zeolite T (offretite type) contaminant.

EXAMPLE 4

This example illustrate the use of seeding gel to suppress the formation of a common by-product zeolite T (offretite) formation. A zeolite synthesis gel was prepared by dissolving 30 g of sodium aluminate ($Al_2O_3$:53 wt %; $Na_2O$: 41 wt %), 150 g of KOH (87.3 wt %), and 20 g of NaOH (98.7 wt %) in 825 ml of deionized water. This liquid was mixed with 750 g of a silica gel solution ($SiO_2$:36.0 wt %). To this mixture was added 106 g of seeding gel which was prepared as described in Example 1 above. The resulting synthesis gel, having the following composition:

$$6.9K_2O:3.8Na_2O:Al_2O_3:27.7SiO_2:47OH_2O$$

was homogenized for 20 minutes and was crystallized in a closed Teflon FEP bottle maintained at 100° C. for 6 days. The product was filtered, washed with deionized water, and dried at 100° C. A total of 105.5 g of crystalline solid, having the following composition in terms of molar oxide ratios:

$$1.05K_2O:0.03Na_2O:Al_2O_3:6.46SiO_2:3.52H_2O$$

was collected which was 95.5% of the 110.5 g theoretical yield based on the solid composition. X-ray diffraction pattern of the solid showed it to be pure and highly crystalline zeolite L, which is listed in Table 1.

TABLE 1

| d(Å) | Relative Intensity |
|---|---|
| 16.2 | 62 |
| 8.04 | 5 |
| 7.62 | 18 |
| 6.06 | 32 |
| 5.87 | 12 |
| 4.62 | 58 |
| 4.44 | 2 |
| 4.36 | 17 |
| 3.94 | 75 |
| 3.83 | 10 |
| 3.68 | 36 |
| 3.50 | 55 |
| 3.42 | 7 |
| 3.30 | 41 |
| 3.19 | 100 |
| 3.08 | 65 |
| 3.02 | 15 |
| 2.92 | 79 |
| 2.87 | 9 |
| 2.85 | 10 |
| 2.80 | 14 |
| 2.74 | 4 |
| 2.68 | 24 |
| 2.66 | 55 |
| 2.63 | 29 |
| 2.56 | 6 |
| 2.51 | 17 |
| 2.48 | 22 |
| 2.44 | 21 |
| 2.42 | 15 |
| 2.38 | 4 |
| 2.36 | 4 |
| 2.30 | 12 |
| 2.28 | 14 |
| 2.20 | 40 |
| 2.16 | 4 |
| 2.13 | 4 |
| 2.05 | 10 |
| 2.01 | 6 |
| 1.95 | 6 |
| 1.89 | 30 |

Scanning electron micrographs showed the solid to be formed of disk-shaped crystals having a diameter of 0.5 to 1.0 microns. See FIG. 3. Nitrogen porosimetry measurement on the solid revealed a BET surface area of 336 $m^2$/g and a pore volume of 0.151 ml/g.

Comparative Example A

This Comparative Example illustrates the formation of by-product zeolite T in the preparation of zeolite L when no seeding gel was used.

A synthesis gel identical to that is Example 3, part A was crystallized at 100° C. for 8 days. This long period was necessary to insure that the material was fully crystallized. The solid was filtered, washed with water, and dried at 100° C. X-ray diffraction pattern of the solid is listed in Table A which shows the solid to be zeolite L contaminated with zeolite T (offretite type).

TABLE A

| d(Å) | Relative Intensity* |
|---|---|
| 16.3 | 57 |
| 11.6 | 6 (T) |

TABLE A-continued

| d(Å) | Relative Intensity* |
|------|---------------------|
| 8.05 | 5 |
| 7.62 | 25 |
| 6.67 | 8 (T) |
| 6.06 | 29 |
| 5.87 | 12 |
| 4.62 | 57 |
| 4.44 | 20 |
| 4.35 | 23 |
| 3.94 | 72 |
| 3.83 | 12 |
| 3.77 | 14 (T) |
| 3.68 | 44 |
| 3.59 | 11 (T) |
| 3.50 | 60 |
| 3.41 | 7 |
| 3.30 | 40 |
| 3.20 | 100 |
| 3.08 | 70 |
| 3.02 | 15 |
| 2.92 | 80 |
| 2.87 | 19 |
| 2.85 | 18 |
| 2.80 | 14 |
| 2.68 | 23 |
| 2.66 | 51 |
| 2.63 | 29 |
| 2.56 | 6 |
| 2.51 | 18 |
| 2.48 | 22 |
| 2.43 | 20 |
| 2.42 | 13 |
| 2.38 | 5 |
| 2.35 | 4 |
| 2.30 | 13 |
| 2.28 | 13 |
| 2.20 | 38 |
| 2.15 | 4 |
| 2.13 | 5 |
| 2.04 | 10 |
| 2.01 | 6 |
| 1.95 | 6 |
| 1.91 | 5 |
| 1.89 | 34 |

*T = Zeolite T

This result is consistent with other reported zeolite L synthesis. In U.S. Pat. No. 4,888,105 reference is made to U.S. Ser. No. 127,657 which is directed to making zeolite L without any Zeolite T impurity. In Example 1 of that application they, in effect, make a comparison example where they make Zeolite L without any seed or without their tetraalkylammonium ion. They characterize it with an XRD in FIG. 1 which shows impurities of Zeolite T (offretite type). See our Table 1 where refractions are identified by the symbol "(T)" as from Zeolite T; these same refractions are in FIG. 1 of U.S. Ser. No. 124,657.

Examples 5-8

A synthesis gel was prepared as follows: 14.80 g of aluminum hydroxide was dissolved by boiling in an aqueous solution containing 135.5 ml of deionized water and 30.00 g of potassium hydroxide (87.3 wt %) pellets. After cooling down to room temperature, any water loss was corrected. This solution was added to 188.10 g of a colloidal silica solution (Ludox HS-30) with stirring. To this mixture was added 20.00 g of seeding gel, prepared in Example 1 above. The resulting synthesis gel, having the following composition:

2.40 $K_2O$:0.49 $Na_2O$:$Al_2O_3$:10.00 $SiO_2$:168.20 $H_2O$ was stirred for 2 minutes and was crystallized in four Teflon-lined autoclaves. These autoclaves were aged at 150° C. for periods ranging from one day (Example 5) to three days (Example 8). Crystalline zeolite L was formed in all cases and the results are summarized in Table 2.

TABLE 2

| Example | Time | Temperature | % Crystallinity* |
|---------|------|-------------|------------------|
| 5 | 24 h | 150° C. | 52 |
| 6 | 44 h | 150° C. | 98 |
| 7 | 63 h | 150° C. | 103 |
| 8 | 72 h | 150° C. | 100 |
| B | 24 h | 150° C. | 1 |
| C | 44 h | 150° C. | 42 |
| D | 63 h | 150° C. | 88 |
| E | 72 h | 150° C. | 100 |

*The peak areas for the reflection from the plane 220 (d = 4.57) and 221 (d = 3.91) of the zeolite were chosen to calculate the % crystallinity of L, and the crystallinity of zeolite L from Comparative Example E was set as 100% in this comparison.

Scanning electron micrographs showed these solids to be formed of circular cylinder crystals having average diameter of 1.6 micron to 1.7 micron. The majority of the cylindrical crystals have an aspect ratio of at least 0.5.

Comparative Examples B-E - Without Seeds

A synthesis gel was prepared as follows: 15.00 g of aluminum hydroxide was dissolved by boiling in an aqueous solution containing 143.50 ml of deionized water, 3.00 g of sodium hydroxide, and 30.00 g of potassium hydroxide pellets (87.3 wt %). After cooling down to room temperature any water loss was corrected. This solution was added to 192.50 g of a colloidal silica solution (Ludox HS-30) with stirring. The resulting synthesis gel, which was identical to the composition in Example 5-8, as follows:

2.40 $K_2O$:0.49 $Na_2O$:$Al_2O_3$:10.00 $SiO_2$:168.20 $H_2O$ was stirred for 2 minutes and was crystallized in four Teflon-lined autoclaves. These autoclaves were aged at 150° C. for from one day (Comparative Example B) to three days (Comparative Example E). Zeolite L formation was much slower in these non-seeded gels and the results are also summarized in Table 2.

Example 5 after 24 hours had 52% crystallinity whereas Comparative Example B without the seeds had only 1% crystallinity. Similarly after 44 hours Example 6 had 98% crystallinity whereas Comparative Example C without the seeds had only 42% crystallinity.

Comparative Example F - With Preformed Seeds

This example is made to show the results when zeolite L seeds are used instead of using a seeding gel according to the present invention.

A synthesis gel was prepared as follows: 2 g of sodium aluminate (53% $Al_2O_3$), 8.8 g potassium hydroxide (87.3 wt %) and 4.3 g of sodium hydroxide (98.7 wt %) was dissolved in 55 g of deionized water. A colloidal silica solution (Ludox AS-40, 50 g) was diluted with 10 g of deionized water. The two solutions were combined and homogenized. A preformed crystalline L zeolite (0.68 g) was added and the mixture was homogenized for 3 minutes. This gel was placed in a teflon bottle at 100° C. for 72 hours. The product was collected by filtration, washed with water and dried at 100° C.

X-ray powder diffraction of this product showed it to be zeolite L, with contamination of zeolite T.

It is understood that the foregoing detailed description is given merely by way of illustration and that many variations may be made therein without departing from the spirit of this invention.

What is claimed is:

1. A method for preparing a crystalline aluminosilicate zeolite L which comprises:
   (a) preparing an aqueous precursor mixture of silica, alumina, and alkali metal hydroxides within the range of the following molar compositions:

$Na_2O$ 0 to 8

$K_2O$ 2 to 9

$Al_2O_3$ 1

$Si_2O$ 5 to 35

$H_2O$ 100 to 600

(b) adding to said precursor mixture from about 0.1 to about 10 percent by weight of an amorphous aluminosilicate seeding gel which does not contain zeolite L and which has a molar composition of $15\pm2$ $Na_2O$ 1 $Al_2O_3$ $14\pm2$ $SiO_2$ $350\pm50$ $H_2O$ (c) stirring or homogenizing the mixture for from 2 minutes to over 2 hours to form a homogenous synthesis gel; and
   (d) reacting the synthesis gel at a temperature of from about 60° to 250° C. for a period of time sufficient to produce crystalline zeolite L.

2. A method according to claim 1, wherein the synthesis gel is reacted for a period of time sufficient to produce a substantially theoretical yield of crystalline zeolite L.

3. The method of claim 1, wherein the temperature is about 100° C. to 150° C.

4. The method of claim 1, wherein the temperature is about 100° C.

5. The method of claim 3, wherein the zeolite L is free of zeolite T contaminant.

6. The method of claim 3, wherein the zeolite has a disk-shaped morphology.

7. The method of claim 3, wherein the average particle size of zeolite L ranges from about 0.3 to 1 micron.

8. The method of claim 1, wherein the silica to alumina ratio of the zeolite is greater than about 6.

* * * * *